Figure 1:
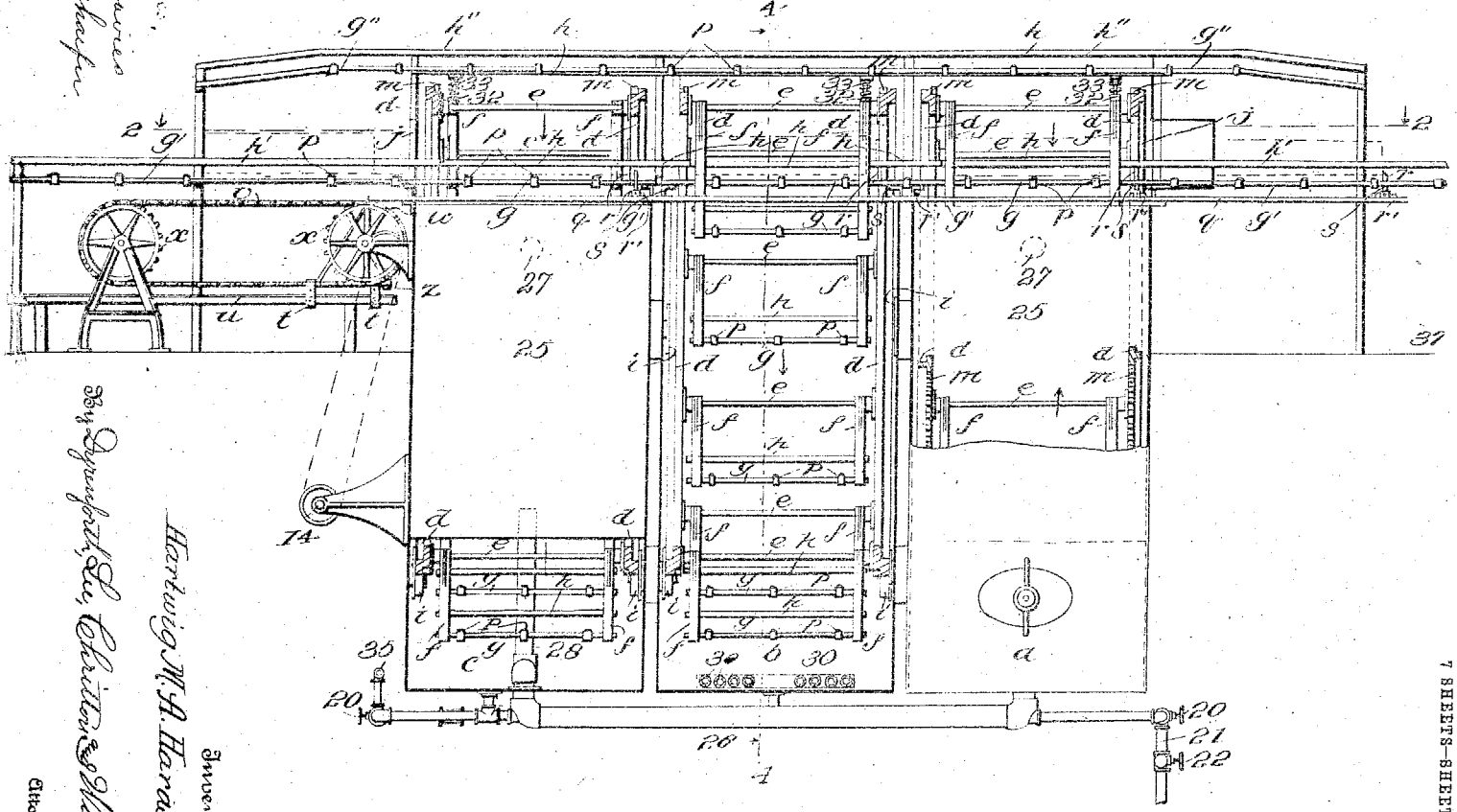

H. M. A. HARDERS.

PASTEURIZING APPARATUS.

APPLICATION FILED NOV. 26, 1909.

Reissued Dec. 27, 1910.

13,188.

7 SHEETS—SHEET 1.

Witnesses,
H. B. Davies
R. A. Schaefer

Inventor,
Hartwig M. A. Harders,
By Dyrenforth, Lee, Chritton & Wiles,
Attorney.

H. M. A. HARDERS.

PASTEURIZING APPARATUS.

APPLICATION FILED NOV. 26, 1909.

Reissued Dec. 27, 1910.

13,188.

7 SHEETS—SHEET 2.

Witnesses:

N. B. Davies

R. A. Schaefer

Inventor:

Hartwig M. A. Harders

Dyrenforth, Lee, Christen & Wiles,

Attorney.

H. M. A. HARDERS.

PASTEURIZING APPARATUS.

APPLICATION FILED NOV. 26, 1909.

Reissued Dec. 27, 1910.

13,188.

7 SHEETS—SHEET 3.

Witnesses;
N. B. Davis
R. A. Schaefer

Inventor
Hartwig M. A. Harders,
By Dyrenforth, Lee, Christton & Miles,
Attorney.

H. M. A. HARDERS.

PASTEURIZING APPARATUS.

APPLICATION FILED NOV. 26, 1909.

Reissued Dec. 27, 1910.

13,188.

7 SHEETS—SHEET 4.

Witnesses:

H. B. Davies

R. A. Schaefer.

Inventor:

Hartwig M. A. Harders,

By Dyrenforth, Lee, Christen & Miles,

Attorney.

H. M. A. HARDERS.

PASTEURIZING APPARATUS.

APPLICATION FILED NOV. 26, 1909.

Reissued Dec. 27, 1910.

13,188.

7 SHEETS—SHEET 5.

Witnesses:

H. B. Davies

R. A. Schafer

Inventor:

Hartwig M. A. Harders,

By Dyrenforth, Lee, Christy & Miles,

Attorney.

H. M. A. HARDERS.

PASTEURIZING APPARATUS.

APPLICATION FILED NOV. 26, 1909.

Reissued Dec. 27, 1910.

13,188.

7 SHEETS—SHEET 6.

Witnesses:

N. B. Davies

R. A. Schafer

Inventor:

Hartwig M. A. Harders, by Dyrenforth, Lee, Christy & Wiles,

Attorney.

H. M. A. HARDERS.

PASTEURIZING APPARATUS.

APPLICATION FILED NOV. 26, 1909.

Reissued Dec. 27, 1910.

13,188.

7 SHEETS—SHEET 7.

Witnesses:

N. B. Davies

P. A. Schaefer

Inventor,

Hartwig M. A. Harders,

By Dyrenforth, Lee, Christton and Wiles,

Attorney

UNITED STATES PATENT OFFICE.

HARTWIG M. A. HARDERS, OF MILWAUKEE, WISCONSIN, ASSIGNOR, BY MESNE ASSIGNMENTS, TO SYDNEY STEIN, OF CHICAGO, ILLINOIS.

PASTEURIZING APPARATUS.

13,188. Specification of Reissued Letters Patent. Reissued Dec. 27, 1910.

Original No. 915,765, dated March 23, 1909. Serial No. 402,435. Application for reissue filed November 26, 1909. Serial No. 530,072.

*To all whom it may concern:*

Be it known that I, HARTWIG M. A. HARDERS, a citizen of the United States, residing at Milwaukee, in the county of Milwaukee and State of Wisconsin, have invented certain new and useful Improvements in Pasteurizing Apparatus, of which the following in a specification, reference being had to the accompanying drawing, forming a part thereof.

This invention relates more particularly to apparatus for successively subjecting bottled beverages and the like, such as beer, to a pasteurizing bath. Its main objects are to facilitate and expedite the operations of handling and pasteurizing bottled beverages such as beer, in such a manner that they may be conveniently delivered from a bottle filling machine directly to the pasteurizing apparatus, and in turn delivered directly from the pasteurizing apparatus to a labeling machine; to gradually raise the bottles and their contents to a pasteurizing temperature, then hold them at that temperature for the requisite period to secure the desired result, and finally reduce their temperature gradually before they are delivered from the apparatus; to perform the pasteurizing operations automatically without special care on the part of operators or attendants; and generally to improve the construction and operation of apparatus of this class.

It consists in certain novel features of construction and in the peculiar arrangement and combinations of parts as hereinafter particularly described and pointed out in the claims.

In the accompanying drawing like characters designate the same parts in the several figures.

Figure 2:
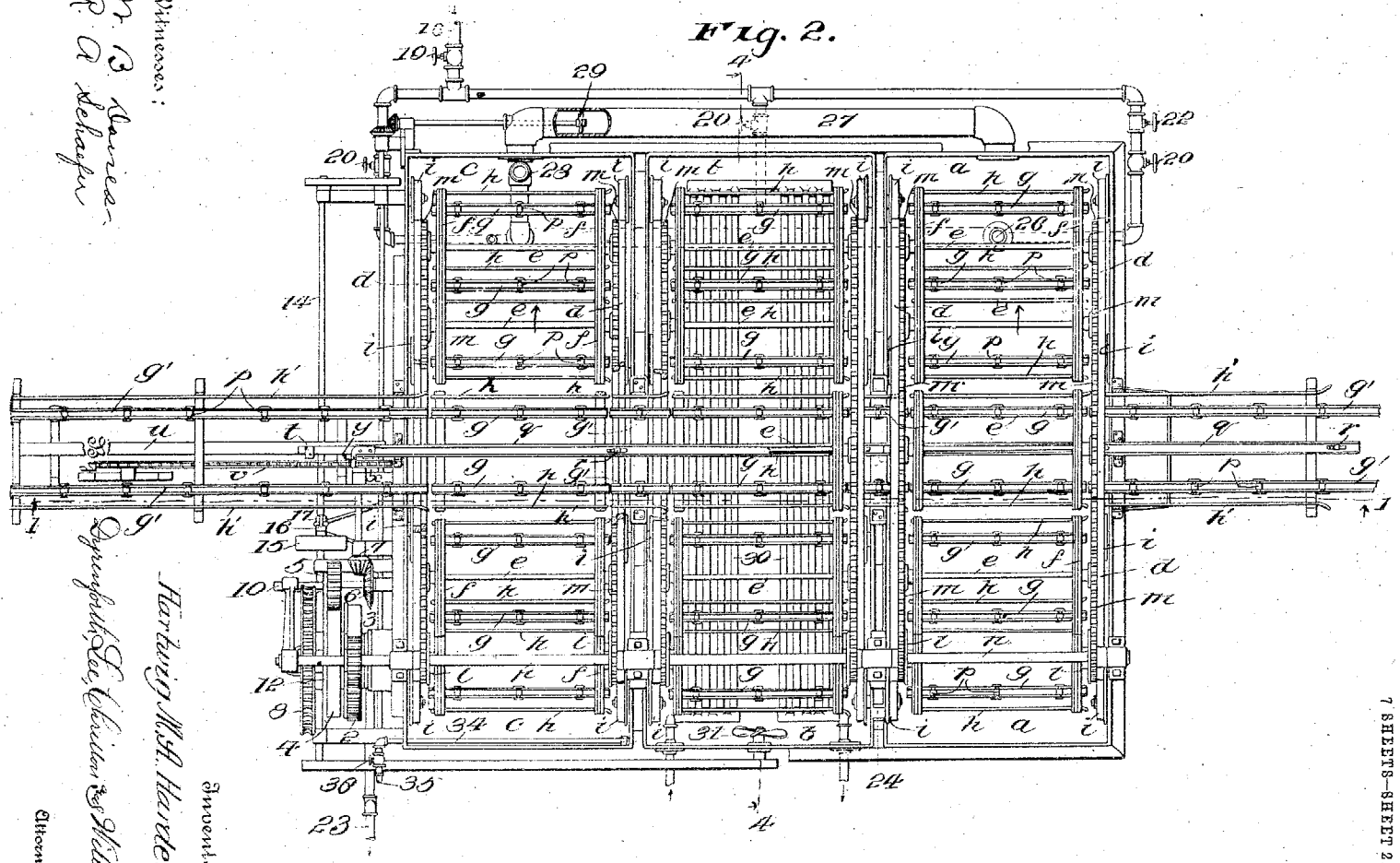
Figure 3:
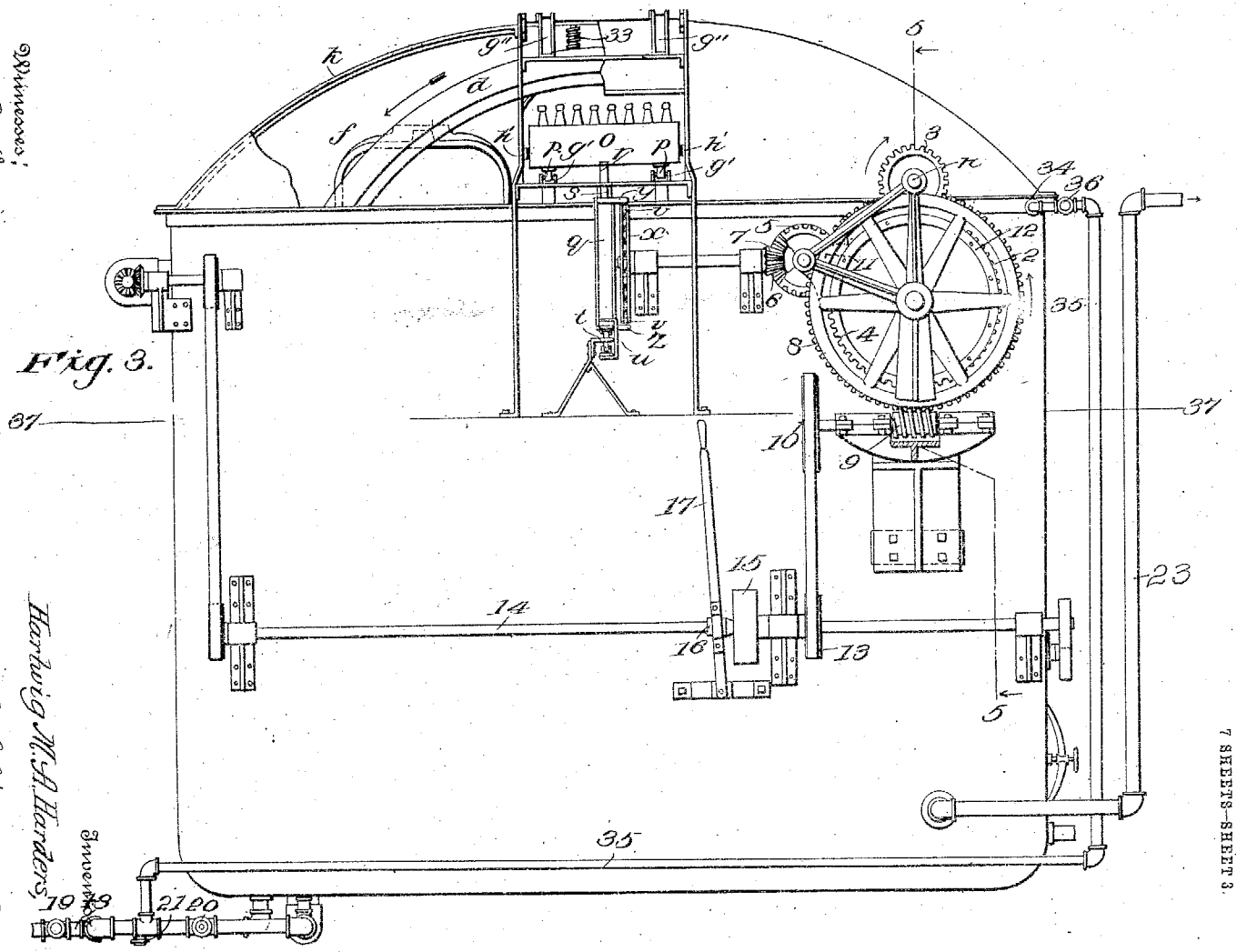
Figure 4:
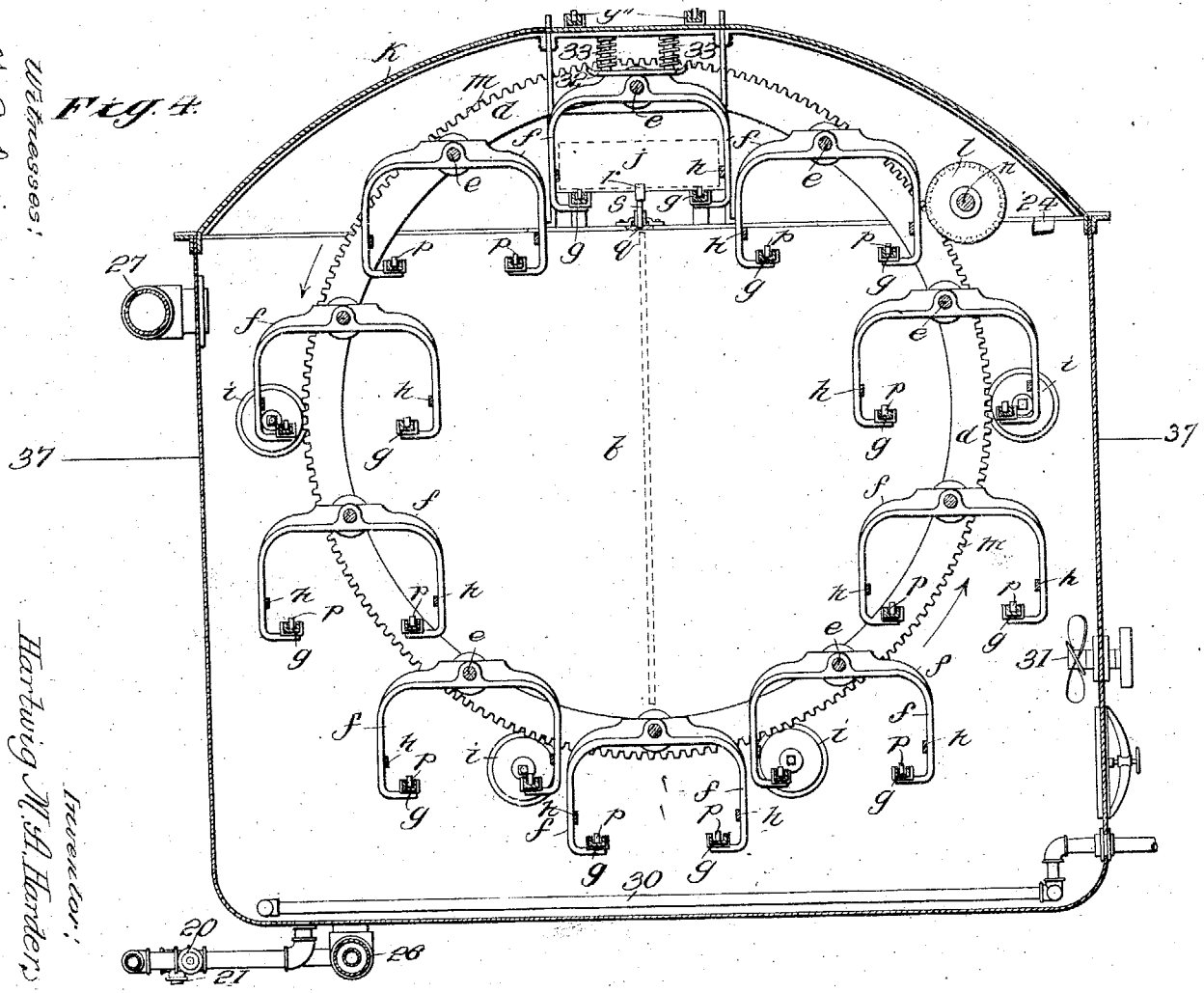
Figure 6:
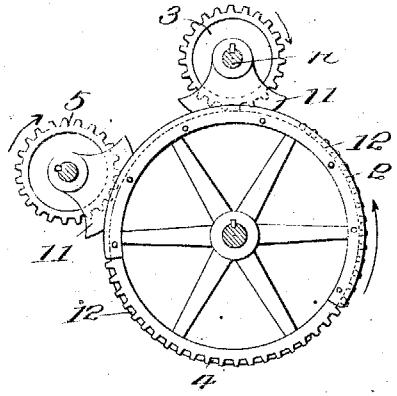
Figure 9:
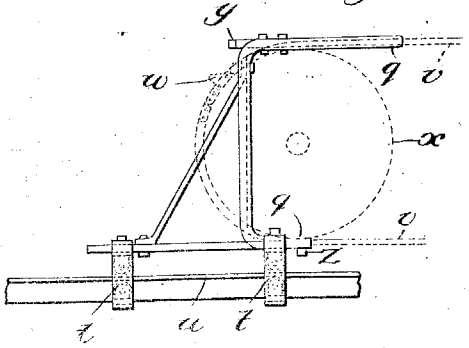
Figure 5:
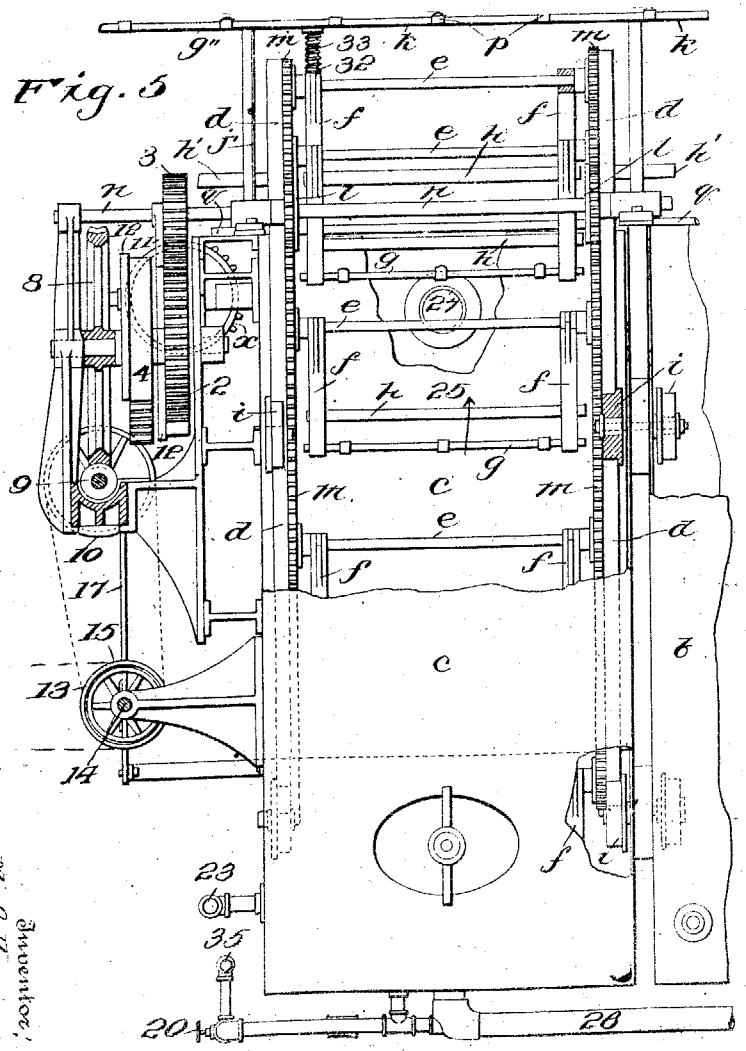
Figure 7:
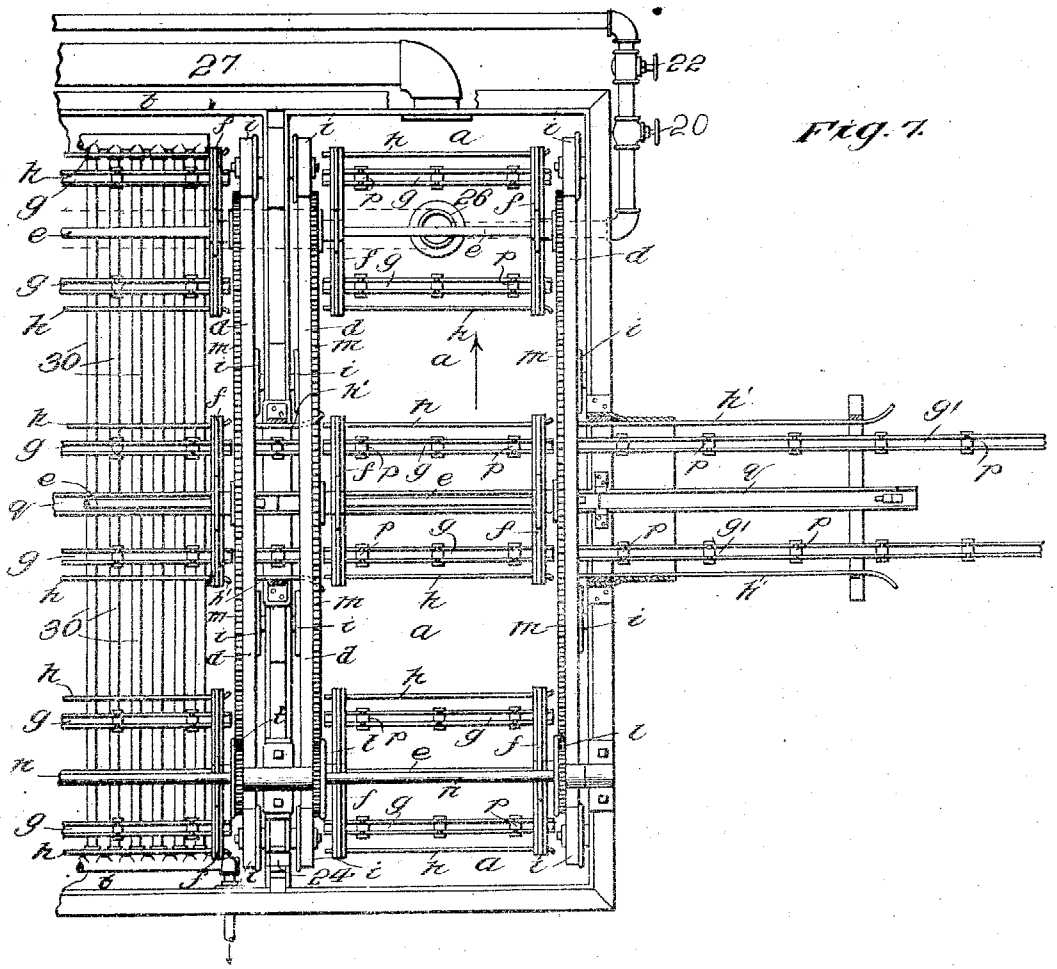
Figure 8:
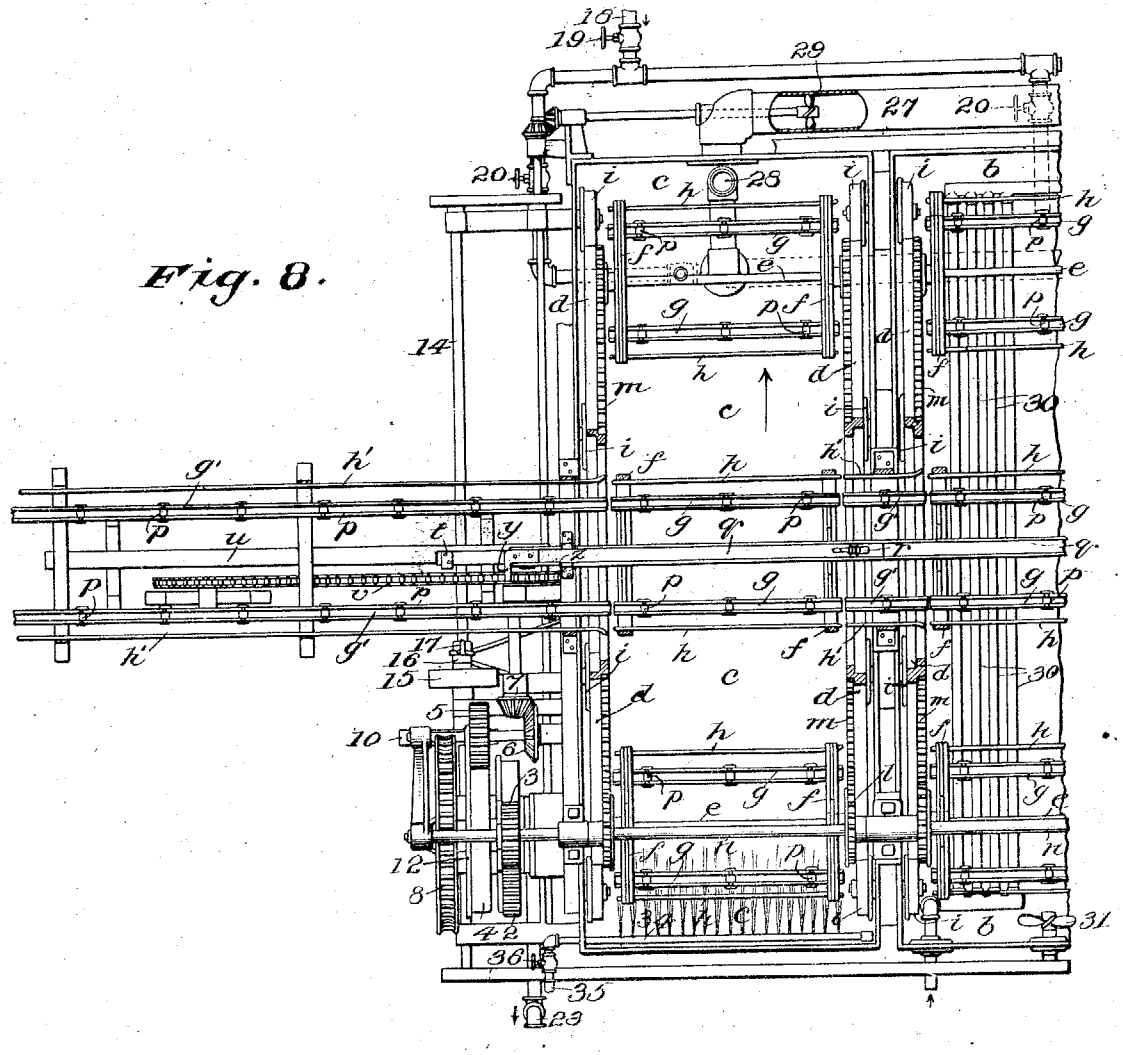

Figure 1 is a vertical longitudinal section on the line 1, 1, Fig. 2, of apparatus embodying the invention; Fig. 2 is a plan view and partial horizontal section on the line 2, 2, Fig. 1 of the apparatus, the cover or top of the tanks or casing being removed; Fig. 3 is an end elevation on an enlarged scale as viewed from the left relative to Figs. 1 and 2; Fig. 4 is an enlarged vertical cross-section through the pasteurizing compartment or tank, on the line 4, 4, Figs. 1 and 2; Fig. 5 is an enlarged side elevation and vertical longitudinal section on the line 5, 5, Fig. 3, showing the driving mechanism and the delivery or cooling compartment or tank; Fig. 6 is a detail view of a part of the driving gearing; Figs. 7 and 8 are plan views on an enlarged scale of the right and left portions respectively of the machine as shown in Fig. 2, certain parts being omitted for the sake of greater clearness; and Fig. 9 is a side elevation showing in detail a portion of the feed-bar and its guides at the delivery end of the apparatus.

The apparatus comprises three tanks or compartments, *a*, *b* and *c*, in the present case, three separate tanks made of boiler plate or heavy sheet metal and arranged side by side with spaces between them. Each tank or compartment is provided with a rotary carrier comprising a pair of spokeless wheels *d* connected by cross rods *e* and having open-ended racks or frames pivotally suspended on said rods. Each rack or frame consists of two yokes or end pieces *f*, a pair of parallel track rails *g*, forming ways, secured to the inwardly bent lower ends of the yokes or end-pieces *f*, and guides *h* attached to the sides of said yokes above and parallel with the rails *g*. The wheels *d* of each carrier run upon and are supported by flanged rollers *i*, which are mounted on the sides of the associated tank or compartment. The several carriers extend above the tops of the tanks so that the rails *g* of the uppermost row of racks will be above the sides of the tanks in position to receive bottle crates or trays and discharge the same through openings at the ends of the apparatus. The tanks are closed at the top over the carriers by a cover or hood which has openings in the ends normally closed by swinging doors *j* and *j'*, and is preferably made with removable sections *k* over the several tanks. The carriers are turned simultaneously and their racks are held in line by pinions *l* meshing with racks *m* on the wheels *d* and mounted on a common driving shaft *n* running lengthwise of the apparatus through the several tanks or compartments.

At the ends of the apparatus and between the tanks, stationary track rails *g'* and guides *h'* are arranged to aline respectively with the rails *g* and guides *h* of each row of racks as they are brought opposite the doors *j* and *j'*.

The bottles containing the beverage to be pasteurized are placed in trays or racks $o$, as shown in Fig. 3, and these trays or crates are placed one after another on the rails $g'$ next to the feed door $j$ over the tank $a$.

To return empty trays or crates from the delivery end to the receiving end of the apparatus, track rails $g''$ and guides $h''$ are provided above the hood or cover, as shown in Figs. 1, 3 and 4, the ends of these return rails and guides being preferably inclined downwardly as shown in Fig. 1. The track rails are provided at intervals with rollers $p$ to facilitate the movement of the bottle trays or crates thereon.

To automatically feed the loaded trays or crates into the apparatus, to transfer them from one carrier to the next, and to discharge them from the last carrier at the proper times, a reciprocating feed-bar $q$ passes lengthwise through the apparatus between, parallel with and a little below the track rails $g'$. This bar is provided at intervals with pivoted dogs $r$, which fold or swing from an upright position toward the delivery end of the apparatus, and are held normally in an upright position against their lateral tail pieces $r'$ by springs $s$. At the delivery end of the machine the bar $q$ is bent downwardly and provided at its lower end with roller guides $t$, which run on a horizontal guide $u$ parallel with said bar, as shown in detail in Fig. 9. For intermittently moving the bar $q$ back and forth the distance required to carry the bottle trays or crates into the apparatus, transfer them from one carrier to another, and finally discharge them at the delivery end of the apparatus, a link belt $v$ provided with a tooth $w$, is mounted on sprocket wheels $x$, parallel with said bar, which is provided with lugs $y$ and $z$ in the path of the tooth $w$.

The rotary bottle carriers are intermittently turned a distance corresponding with the distance between adjacent rows of racks, by a mutilated gear 2, which meshes with a pinion 3 on the shaft $n$, and the link belt $v$ is intermittently turned the distance of one complete circuit while the rotary carriers are at rest by a similar mutilated gear 4, which meshes with a pinion 5 on a shaft connected by bevel gears 6 and 7, as shown in Figs. 2, 3 and 8, with the shaft of one of the sprocket wheels $x$. The gears 2 and 4 are fixed on a shaft parallel with the shaft $n$ and provided with a worm gear 8 meshing with a worm 9 on a transverse shaft which is provided with a pulley 10, as shown in Figs. 3 and 5. As shown in Figs. 2, 3, 5, 6, 7 and 8, each of the pinions 3 and 5 is associated with a shoe 11, having a fixed relation thereto and adapted after each complete revolution to engage with the periphery of a flange 12 on the driving gear and to prevent the pinion from turning when it is not engaged by the teeth of the driving gear. The toothed portions of the two driving gears 2 and 4 are so arranged that while one pinion is being turned, the other is held stationary.

The pulley 10 on the worm-shaft may be driven from any convenient source of power. As shown in Figs. 3 and 5, it is belted to a pulley 13 on a shaft 14, extending across the delivery end of the apparatus, and provided with a driving pulley 15 and a clutch 16, operated by a lever 17, for starting and stopping the mechanism.

A water supply pipe 18, provided with a valve 19, is connected with the several tanks $a$, $b$ and $c$ at the bottom by branches which are provided with valves 20. A drain pipe 21 provided with a valve 22, as shown in Fig. 1, connects with one of the branches in such a way that either the tanks $a$ and $c$ or the tank $b$ can be drained when the valve 19 is closed, by opening the proper valves 20 and the valve 22.

The tank $c$ is provided with an overflow pipe 23, which prevents the water from rising above the desired level in any of the tanks, the tanks $a$ and $c$ being connected with each other as hereinafter explained, and the middle tank $b$ having an overflow connection 24 into the tank $a$, as shown in Figs. 2, 4 and 7.

Each of the tanks $a$ and $c$ is partially divided by a central vertical partition 25, parallel with the axis of the rotary bottle carriers, into two subdivisions, in which the water may be maintained at different temperatures. The subdivisions on the descending side of the carriers are connected by circulating pipes 26 and 27. The pipe 26 opens directly into the bottom of the tank $a$, but has an extension 28 leading upwardly into the tank $c$ and terminating therein above the lower edge of the partition 25. The pipe 27 opens at its ends into the upper parts of said tanks. A constant circulation of water through the subdivisions of the tanks $a$ and $c$ with which the pipes 26 and 27 directly communicate, is maintained while the apparatus is in operation, by a small propeller wheel 29 in the pipe 27. This wheel may be driven from the main shaft 14 by connections substantially as shown in Figs. 2, 3 and 8. By this means substantially the same temperature is maintained in these subdivisions of the tanks $a$ and $c$. The middle tank $b$ is provided as shown in Figs. 1, 2, 7 and 8, with steam pipes or coils 30, for heating the water therein, and the water is agitated so as to keep it at approximately the same temperature throughout the tank by a propeller wheel 31, which may be connected with and driven from the main shaft 14, as shown in Figs. 2 and 8.

To prevent the pivotally suspended racks from swinging, and to hold their track rails $g$ in line with the stationary track rails $g'$, vertically movable shoes or plates 32 are connected with the hood or cover, as shown in Figs. 1, 4 and 5, and are pressed downwardly by springs 33 against the horizontal faces on the upper sides of the yokes $f$ at one or both ends of said racks as they are brought into line with the doors $j$ and $j'$.

A perforated pipe 34 is arranged across the upper part of the tank $c$ in position to direct a spray or stream of water against the bottles on the ascending side of the carrier in said tank, as indicated in Fig. 8, and is connected by a pipe 35 with a branch of the supply pipe 18, said pipe 35 being provided with a valve 36.

The greater portion of the tanks $a$, $b$ and $c$ may be located below the operating floor, which is indicated in Figs. 1, 3 and 4 by the lines 37.

In the operation of the apparatus the water in the middle tank or compartment $b$ is heated to and maintained at a pasteurizing temperature of about 140° F. by the steam pipes or coils 30. The water in the subdivisions of the tanks or compartments $a$ and $c$ on the descending side of the carriers (indicated by arrows) is maintained at about 110° F., while the water in the remaining subdivision of the tank $a$ is maintained at about 140° F., and the water in the remaining subdivision of the tank $c$ is maintained at about 88° F. Although the temperatures in the different parts of the apparatus may be varied somewhat without materially affecting the results attained, those above stated have been found in practice suitable for the purpose. The driving mechanism being set in motion, the rotary carriers are intermittently turned together in the direction indicated by arrows, bringing one row of racks after another into line with the doors $j$ and $j'$. The bottles containing the beverage to be pasteurized are taken from the filling machine and placed in trays or crates $o$ on the stationary track rails $g'$ next to the receiving tank $a$, the first tray or crate being placed so that the dog $r$ at the adjacent end of the feed-bar $q$ will stand up behind it, as indicated in Fig. 1, when said bar is in its normal position. While the rotary carriers stand at rest with a row of racks in line with the doors $j$ and $j'$, the feed bar $q$ is advanced by the engagement of the tooth $w$ on the link belt $v$ with the lug $y$ on feed bar $q$, said belt being driven intermittently by the mutilated gear 4 hereinbefore described, so that the tooth $w$ makes a complete circuit at each movement, starting from about the point where it is shown in Fig. 1, clearing said lug $y$ at the limit of the advance movement of said bar and leaving the lug $z$, as shown in Fig. 9, in the path of the return movement of said tooth on the under side of the belt. By this advance movement of the bar $q$, the first tray or crate is carried into the uppermost rack of the carrier in the tank $a$, opening the door $j$, which closes behind it. The tooth $w$ passing back on the under side of the belt $v$, engages with the lug $z$ and moves the bar $q$ back to its original position, the dog $r$ at its opposite end being turned back against the tension of its spring $s$ so as to pass under the tray or crate just deposited in the adjacent carrier. Trays or crates filled with bottles are placed one after another in position to be fed into the apparatus, as the foregoing operations are repeated. After making a complete circuit through the receiving and warming tank $a$, each tray or crate of bottles which has been gradually raised to or approximately to a pasteurizing temperature, is transferred automatically by the feed bar $q$ into the second carrier, wherein it makes a complete circuit through the pasteurizing tank $b$ and is held for a certain period at the pasteurizing temperature. From this carrier each tray or crate of bottles is transferred in like manner by the action of the feed bar $q$ into the last carrier, wherein it makes a complete circuit through the tank $c$, its temperature being gradually lowered until it is in proper condition for delivery from the apparatus. From the last carrier each tray or crate of bottles is discharged upon the stationary track rails $g'$, opening the door $j'$ which closes behind it at that end of the apparatus. Here the bottles are removed from the trays or crates, and may be conveniently passed directly to a labeling machine, thereby avoiding, as in the feeding of the pasteurizing apparatus directly from the bottling machine, unnecessary handling. The empty trays or crates are returned to the feeding operator upon the elevated track rails $g''$. As the trays or crates are transferred from one carrier to another, and discharged from the last carrier, their places are taken by other trays or crates, which are fed into the apparatus, advanced from one carrier to the next, and finally discharged from the last carrier by the action of the feed bar $q$ and its dogs $r$ during every stop of the carriers. If crates or trays of freshly filled bottles are supplied by the feeding operator so that a tray or crate is fed into the apparatus every time the carrier is stopped, the apparatus will be kept filled, any tray or crate will be delivered from the apparatus at each stop of the carrier. As the heated bottles received into the last carrier from the pasteurizing tank $b$ descend in the tank $c$, they are gradually cooled, imparting their heat to the water in that subdivision of the tank. Water thus heated and tending to rise, is forced by the propeller 29 through the pipe 27 into the upper part of the corresponding subdivision in tank $a$, where it is utilized to gradually warm the cooled bottles and their contents as they descend in that tank. The water being thus cooled and tending to descend in this subdivision of the apparatus, is conveyed back through the pipe 26 and its extension 28 into the corresponding subdivision of tank *c*, where it again serves to cool the bottles and their contents as they descend therein.

By extending the return pipe 26 upward in the tank *c* above the lower edge of the partition 25 on the side next to that with which the pipe 27 is connected, the water in the subdivision on the opposite side of said partition is kept cooler. As the bottles ascend in tank *c*, they are subjected to sprays or jets of fresh cool water from the pipe 34, the supply of such water being regulated by the valve 36, so that the bottles and their contents as they are delivered from the apparatus, will have the desired temperature.

The apparatus as herein shown and described may be used to advantage for soaking, cleansing and sterilizing bottles or the like and sterilizing the contents of bottles, or the like, as well as for pasteurizing.

Various modifications in the details of construction and arrangement of parts of the apparatus may be made without materially affecting its mode of operation and without departing from the principle and scope of the invention.

What I claim as new, and desire to secure by Letters Patent, is—

1. The combination of a tank, an open-center rotary carrier in said tank, open-ended carriers suspended on said rotary carrier, ways on said suspended carriers whereby crates or trays of bottles or the like may be introduced into one end of said suspended carriers and discharged from the opposite ends thereof, and stationary ways at opposite sides of said rotary carrier with which the ways of the suspended carriers successively aline in the rotation of said rotary carrier, for the purpose set forth.

2. The combination of a tank, an open-center rotary carrier in said tank, open-ended carriers suspended on said rotary carrier, ways on said suspended carriers whereby crates or trays of bottles or the like may be introduced into one end of said suspended carriers and discharged from the opposite ends thereof, stationary ways at opposite sides of said rotary carrier with which the ways of the suspended carriers successively aline in the rotation of said rotary carrier, and means operating through said rotary carrier to introduce trays or crates upon the ways of said pivotally suspended carriers and discharge them therefrom after they have been moved by the rotary carrier through the tank.

3. The combination with a tank, an open-center rotary carrier in said tank, open-ended carriers pivotally suspended on said rotary carrier, ways on said suspended carriers whereby crates or trays of bottles or the like may be introduced into one end of said suspended carriers and discharged from the opposite ends thereof, means intermittently operating said rotary carrier, and means operating automatically through said rotary carrier to introduce upon the suspended carriers such trays or crates and to discharge them therefrom after such trays or crates have been moved by said rotary carrier through the tank.

4. The combination of a plurality of tanks, open-center rotary carriers in the tanks, open-ended carriers pivotally suspended on said rotary carriers, ways on said suspended carriers, means for intermittently moving said rotary carriers, and means operating automatically and alternately with relation to said rotary carrier, moving means to introduce trays or crates of bottles, or the like, into one of said suspended carriers upon its ways, transferring said crates or trays therefrom to each of the remaining rotary carriers and discharging them from the last carrier.

5. The combination of a tank, an open-center rotary carrier in the tank, open-ended carriers pivotally suspended on said rotary carrier for the introduction at one end and the discharge at their opposite ends of trays or crates of bottles, or the like, stationary ways at opposite sides of the rotary carrier with which the ways of the suspended carriers carried thereby, in the rotation of said rotary carrier, successively aline, intermittently operating means for actuating said rotary carrier to bring the ways of its suspended carriers successively into alinement with the stationary ways, and means operating through said rotary carrier to move such trays or crates of bottles, or the like, into and out of the ways on said suspended carriers.

6. The combination of a tank, an open-center rotary carrier in the tank, open-ended carriers pivotally suspended on said rotary carrier for the introduction at one end and the discharge at their opposite ends of trays or crates of bottles, or the like, stationary ways at opposite sides of the rotary carrier with which the ways of the suspended carriers carried thereby, in the rotation of said rotary carrier, successively aline, intermittently operating means for actuating said rotary carrier, to bring the ways of its suspended carriers successively into alinement with the stationary ways, and means operating through said rotary carrier to move such trays or crates of bottles, or the like, into and out of the ways on said suspended carriers and from one rotary carrier to the other in succession.

7. The combination of a tank, an open-center rotary carrier in said tank, open-ended carriers suspended on said rotary carrier, ways on said suspended carriers whereby crates or trays of bottles, or the like, may be introduced into one end and discharged from the opposite end of said suspended carriers, stationary ways at opposite sides of the rotary carriers with which the ways of the suspended carriers successively aline in the rotation of said rotary carrier, intermittently-operating means for actuating said rotary carrier to bring the ways of said suspended carriers successively into alinement with said stationary ways, and carrier-driven means operating alternately with relation to said rotary carrier-actuating means to move such trays or crates into and out of said suspended carriers.

8. The combination of a tank an open-center rotary carrier therein provided with a plurality of open-ended carriers suspended thereon and provided with ways, means for moving said rotary carrier, and means operating automatically and alternately with relation to said rotary carrier-moving means for introducing crates or trays of bottles, or the like, upon the ways of said suspended carriers and to discharge them therefrom after they have been moved by said rotary carrier through the tank.

9. The combination of a plurality of tanks, open-center rotary carriers in the tanks, each provided with open-ended carriers suspended thereon, ways in said suspended carriers, means for moving said rotary carriers and means operating automatically and alternately with relation to said rotary carrier-moving means to introduce trays or crates of bottles, or the like, upon the ways of said suspended carriers, transferring said trays or crates therefrom to a similarly suspended carrier on each of the remaining rotary carriers, and delivering them from the last rotary carrier, for the purpose set forth.

10. The combination of a tank, an open-center rotary carrier in said tank provided at intervals with open-ended carriers pivotally suspended thereon, each of which is open to the introduction into it at one end and to the discharge at its opposite end of trays or crates of bottles, or the like, ways in said suspended carriers, stationary ways at opposite sides of the rotary carrier with which the ways of the suspended carriers successively aline in the rotation of said rotary carrier, intermittently-operated means operating automatically to actuate said rotary carrier to bring the ways of said suspended carriers successively into alinement with the stationary ways, and means operating to move such trays or crates into and out of the ways on said suspended carriers.

11. In a pasteurizing apparatus, the combination of a tank, an open-center rotary carrier mounted in said tank and provided with ways parallel with its axis, stationary ways arranged to aline with the ways on the upper side of the carrier at opposite ends thereof, a reciprocating feed bar passing through said carrier parallel with its ways and provided with dogs which are adapted to engage with bottle-trays or crates and move them on said ways into and out of the carrier, and means for intermittently turning said carrier, substantially as described.

12. In a pasteurizing apparatus, the combination of a plurality of tanks or compartments, open-center rotary carriers mounted coaxially in said tanks or compartments and provided with ways parallel with the axis of the carriers, stationary ways arranged to aline with the ways on the upper side of the carriers at opposite ends thereof, a reciprocating feed bar passing through the several carriers parallel with their axes and provided at intervals with dogs for moving bottle-crates on said ways into and out of the apparatus and from one carrier into another, and means for intermittently turning said carriers, substantially as described.

13. In pasteurizing apparatus, the combination of a tank, rollers mounted on opposite sides of said tank, an open-center rotary carrier mounted on said rollers, ways pivotally hung on said carrier parallel with its axis, means for intermittently turning said carrier, stationary ways arranged to aline with the ways on the upper side of the carrier at opposite ends thereof, and a reciprocating bar passing through said carrier parallel with said ways and provided with means for moving bottle-trays or crates on said ways into and out of the carrier, substantially as described.

14. In pasteurizing apparatus, the combination of a plurality of tanks, or compartments, arranged side by side, rollers mounted on opposite sides of said tanks or compartments, open-center rotary carriers mounted coaxially in the several tanks or compartments on said rollers, ways pivotally hung on each of said carriers parallel with its axis, stationary ways arranged to aline with the ways on the upper side of the carriers between them and at the ends of the apparatus, means for intermittently turning said carriers together, and a reciprocating bar passing through the several carriers parallel with said ways and provided with means for engaging and moving bottle-trays or crates on said ways into and out of the apparatus and from one carrier into another, substantially as described.

15. In pasteurizing apparatus, the combination of a tank, a carrier rotatably mounted therein, open-ended frames pivotally suspended on said carrier and provided with ways parallel with its axis, stationary ways arranged to aline with the ways on the upper side of the carrier at opposite ends thereof, said carrier being open at the ends between the stationary ways and the ends of said frames, means for holding each frame on the upper side of the carrier motionless with its ways in alinement with the stationary ways, means for intermittently turning said carrier, and means for automatically moving bottle-trays or crates upon said ways into and out of the first and last carriers and from one carrier into another, substantially as described.

16. In pasteurizing apparatus, the combination of a tank, an open-center carrier rotatably mounted therein, frames pivotally suspended on said carrier and provided with ways parallel with its axis, stationary ways arranged to aline with the ways on the upper side of the carrier at opposite ends thereof, a reciprocating bar passing through said carrier parallel with said ways and provided with means for moving bottle-trays or crates upon said ways into and out of said carrier, and mechanism for intermittently turning said carrier and alternately moving said bar back and forth, comprising a pair of mutilated gears, pinions meshing therewith and locking shoes connected with the pinions and fitting curved rims or flanges on the toothless portions of the gears, said gears being arranged to turn said pinions alternately, substantially as described.

17. In pasteurizing apparatus, the combination of a tank, an open-center carrier rotatably mounted therein and provided with ways parallel with its axis, stationary ways arranged to aline with the ways in the upper part of the carrier at opposite ends thereof, means for intermittently turning said carrier, a reciprocating bar passing through said carrier parallel with said ways and provided with means for moving bottle-trays or crates on said ways into and out of the carrier, sprocket wheels, a link belt mounted on said sprocket wheels parallel with said bar and provided with a tooth adapted by engagement with lugs on said bar to move the same back and forth, and means for intermittently turning said sprocket wheels, substantially as described.

18. In pasteurizing apparatus, the combination of a tank provided on opposite sides with rollers, a carrier comprising spokeless wheels mounted on said rollers and connected by cross rods, frames pivotally suspended from said cross rods and having ways parallel therewith, one of said wheels having a circular rack or gear, a driving shaft parallel with the axis of said carrier and provided with a pinion meshing with said gear, means for intermittently turning said shaft, and stationary ways arranged to aline with the ways of said frames in the upper part of the carrier at opposite ends thereof, substantially as described.

19. In pasteurizing apparatus, the combination of a plurality of tanks or compartments having rollers mounted on opposite sides thereof and coaxial rotary carriers mounted on said rollers and each comprising a pair of spokeless wheels connected by cross rods, and a circular rack or gear, a driving shaft provided with pinions meshing with said racks or gears, means for turning said shaft intermittently, frames pivotally suspended from said cross rods and having ways parallel therewith, stationary ways arranged to aline with the ways of said frames in the upper part of the carriers at opposite ends thereof, and means for moving bottle trays or crates on said ways into and out of the first and last carriers and from one carrier into another, substantially as described.

20. In pasteurizing apparatus, the combination of a tank, a rotary carrier mounted therein, stationary ways arranged above and at the ends of said tank parallel with the axis of the carrier, stationary guides arranged at the sides of, above and parallel with said ways, racks pivotally suspended in said carrier and having ways and guides parallel with its axis and arranged to be brought on the upper side of the carrier into alinement with the stationary ways and guides, the ends of the racks and the ends of the carrier being open, and means for intermittently turning said carrier, substantially as described.

21. In pasteurizing apparatus, the combination of a plurality of tanks, coaxial open-center carriers rotatably mounted in said tanks, stationary ways and side guides arranged between and at the outer ends of said tanks parallel with the axis of the carriers, frames pivotally suspended in said carriers and having ways and side guides parallel with their axis and arranged to be brought into alinement on the upper side of the carriers with the stationary ways and guides, means for intermittently turning said carriers, and means for automatically moving bottle-trays or crates on said ways into and out of the first and last carriers and from one carrier into another, substantially as described.

22. In pasteurizing apparatus, the combination of a plurality of tanks, coaxial open-center carriers rotatably mounted therein, stationary ways located above and at the ends of the tanks parallel with the axis of the carriers, frames pivotally suspended in the carriers and having ways arranged to be brought on the upper side of the carriers into line with the stationary ways, return ways extending over the carriers from one end of the apparatus to the other, means for intermittently turning said carriers, and a reciprocating bar passing through the carriers and provided with means for moving bottle-trays or crates on said ways into and out of the apparatus and from one carrier into another, substantially as described.

23. In pasteurizing apparatus, the combination of three tanks arranged side by side, open-center carriers rotatably mounted in said tanks, vertical partitions extending through the carriers in the two outer tanks, circulating pipes connecting the outer tanks on one side of said partitions, means for heating liquid contained in the middle tank, stationary ways located above and at the ends of the tanks parallel with the axis of the carriers, frames suspended on the carriers and having ways arranged to be brought on the upper side of the carrier into line with the stationary ways, means for intermittently turning said carriers, and a reciprocating bar passing through the several carriers parallel with said ways and provided with means for moving bottle-trays or crates thereon into and out of the apparatus and from one carrier into another, substantially as described.

24. In pasteurizing apparatus, the combination of three tanks arranged side by side, rotary carriers mounted in said tanks and provided with supporting frames for bottle-trays or crates, the carriers in the two outer tanks being open through the center, means for turning said carriers, vertical partitions extending through the carriers in the two outer tanks, circulating pipes connecting said outer tanks on one side of said partitions, one of said pipes communicating with the upper parts of said tanks and the other pipe leading from the lower part of the first tank and opening into the other tank above the lower edge of the partition therein, and means for heating liquid contained in the middle tank, substantially as described.

25. In pasteurizing apparatus, the combination of a number of tanks arranged side by side, rotary carriers mounted in said tanks and provided with supporting frames for bottle-trays or crates, the carriers in the two outer tanks being open through the center, means for turning said carriers, vertical partitions extending through the carriers in the two outer tanks, circulating pipes connecting said outer tanks on one side of said partitions, one of said pipes communicating with the upper parts of said tanks and the other pipe leading from the lower part of the first tank into the other tank, means for heating liquid contained in the middle tank, a spray or jet pipe arranged in the upper part of the last tank to direct cool water toward the ascending side of the carrier therein, and an overflow connection leading out of one of the outer tanks, substantially as described.

26. In pasteurizing apparatus, the combination of a number of tanks, rotary carriers mounted in said tanks and provided with supporting frames for bottle-trays or crates, the two outer carriers being open through the center, means for turning said carriers, vertical partitions extending through the carriers in the two outer tanks, circulating pipes connecting said outer tanks on one side of said partitions, means for heating liquid contained in the middle tank, a spray or jet pipe arranged in the upper part of the last tank to direct cool water toward the ascending side of the carrier therein, and an overflow from said tank substantially as described.

27. In pasteurizing apparatus, the combination of a number of tanks arranged side by side, rotary carriers mounted therein and provided with supporting frames for bottle-trays or crates, the two outer carriers being open through the center, means for turning said carriers, vertical partitions extending through the carriers in the two outer tanks, circulating pipes connecting said outer tanks on one side of said partitions, means for heating liquid contained in the middle tank, and a water supply pipe and a drain pipe having valve controlled branch connections with the lower parts of said tanks, substantially as described.

28. In pasteurizing apparatus, the combination of a number of tanks arranged side by side, endless carriers rotatably mounted in said tanks and having supports for bottle-trays or crates, the two outer carriers being open through the center, a vertical partition extending through the carrier in each outer tank and forming subdivisions which communicate with each other at the bottom, circulating connections between said subdivisions on the descending side of the carriers, means for heating liquid contained in the middle tank, means for turning said carriers, and means for feeding bottle-trays or crates into and discharging them from the apparatus, substantially as described.

29. In pasteurizing apparatus, the combination of a number of tanks arranged side by side, endless bottle-carriers movably mounted in said tanks and provided with supports for bottle-trays or crates, a partition extending through the carrier in each outer tank and forming subdivisions which communicate with each other at the bottom, circulating connections between said subdivisions on the descending side of the carriers, means for heating liquid contained in the middle tank, a cool water supply connection leading into the upper part of the subdivision of the last tank on the ascending side of the carriers, an overflow leading out of the lower part of the last tank, means for turning said carriers, and means for feeding bottle-trays or crates into and discharging them from the apparatus, substantially as described.

30. The combination of a tank, an open-center endless carrier mounted in said tank and provided with transverse horizontal ways, stationary ways arranged to aline with the ways in the upper part of the carrier at the ends thereof, a reciprocating feed bar passing through said carrier parallel with its ways and provided with a dog adapted to move bottle-trays or crates on said ways into and out of the carrier, and means for intermittently turning said carrier, substantially as described.

31. The combination of a tank, an open-center rotary carrier, open-ended frames pivotally suspended in said carrier parallel with its axis, and stationary ways arranged to aline with said frames in the upper part of the carrier at opposite ends thereof, substantially as described.

32. The combination of a tank, an endless carrier mounted therein and open at the ends, open-ended transverse frames pivotally suspended in said carrier, stationary ways arranged to aline with said frames in the upper part of the carrier at opposite ends thereof, a reciprocating bar passing through said carrier parallel with said ways and provided with a dog for moving bottle-trays or crates on said ways into and out of the frames in said carrier, and means for intermittently turning said carrier, substantially as described.

HARTWIG M. A. HARDERS.

In presence of—
EDWIN O. STOPS,
CHAS. L. GOSS.